US012720110B2

(12) United States Patent
Zhao et al.

(10) Patent No.: US 12,720,110 B2
(45) **Date of Patent: *Aug. 25, 2026**

(54) JOINT COMPONENT SECONDARY TRANSFORM

(71) Applicant: Tencent America LLC, Palo Alto, CA (US)

(72) Inventors: Xin Zhao, Palo Alto, CA (US); Sehoon Yea, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/916,112

(22) Filed: Oct. 15, 2024

(65) Prior Publication Data

US 2025/0039455 A1 Jan. 30, 2025

Related U.S. Application Data

(63) Continuation of application No. 18/154,449, filed on Jan. 13, 2023, now Pat. No. 12,149,740, which is a continuation of application No. 17/072,606, filed on Oct. 16, 2020, now Pat. No. 11,616,983.

(60) Provisional application No. 63/020,280, filed on May 5, 2020.

(51) Int. Cl.

| | |
|---|---|
| ***H04N 19/70*** | (2014.01) |
| ***H04N 19/44*** | (2014.01) |
| ***H04N 19/61*** | (2014.01) |
| ***H04N 19/91*** | (2014.01) |

(52) U.S. Cl.
CPC ............. *H04N 19/61* (2014.11); *H04N 19/44* (2014.11); *H04N 19/70* (2014.11); *H04N 19/91* (2014.11)

(58) Field of Classification Search
CPC ........ H04N 19/61; H04N 19/44; H04N 19/70; H04N 19/91
USPC .................................................... 375/240.12
See application file for complete search history.

(56) References Cited

U.S. PATENT DOCUMENTS

| | | | | |
|---|---|---|---|---|
| 11,184,612 | B2 * | 11/2021 | Kanoh | H04N 19/61 |
| 11,206,428 | B1 * | 12/2021 | Zhao | H04N 19/136 |
| 2021/0092396 | A1 * | 3/2021 | Zhang | H04N 19/117 |
| 2021/0112258 | A1 * | 4/2021 | Li | H04N 19/124 |

* cited by examiner

*Primary Examiner* — Albert Kir
(74) *Attorney, Agent, or Firm* — Morgan, Lewis & Bockius LLP

(57) ABSTRACT

An example method of decoding an encoded video bitstream using at least one processor includes obtaining an encoded video bitstream, the encoded video bitstream including encoded color components. The method also includes entropy parsing the encoded color components and dequantizing the color components and obtaining transform coefficients of the color components. The method further includes applying a joint components secondary transform (JCST) on the transform coefficients of the color components, thereby generating JCST outputs. The method also includes performing a backward transform on the JCST outputs, thereby obtaining residual components of the color components; and decoding the encoded video bitstream based on the residual components of the color components.

20 Claims, 10 Drawing Sheets

200
230
240
210
220
Network
250

300
301
302
303
304
305
306
307
308
309
310
311
312
313

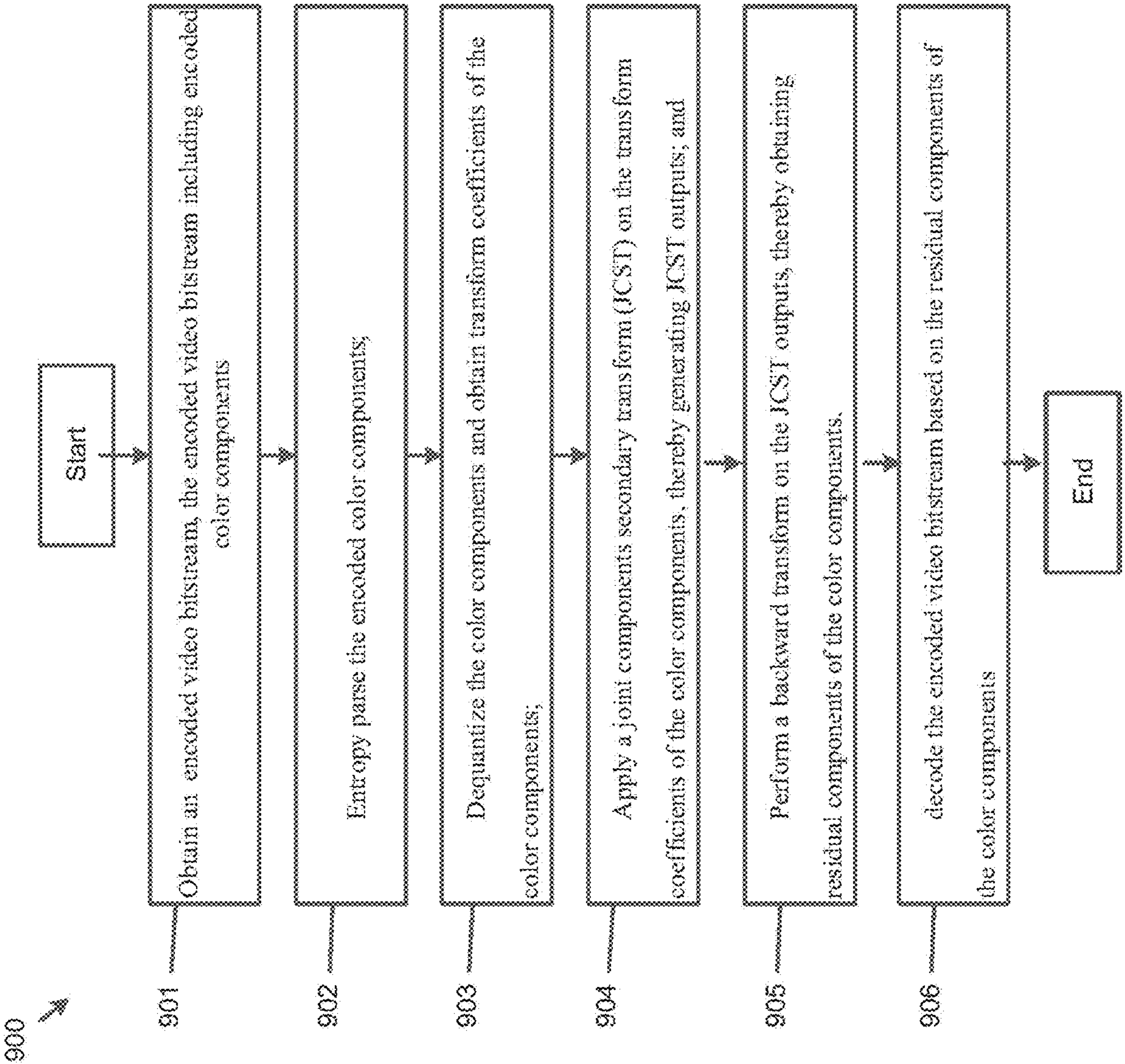
FIG. 9
900
Start
901
Obtain an encoded video bitstream, the encoded video bitstream including encoded color components
902
Entropy parse the encoded color components;
903
Dequantize the color components and obtain transform coefficients of the color components;
904
Apply a joint components secondary transform (JCST) on the transform coefficients of the color components, thereby generating JCST outputs; and
905
Perform a backward transform on the JCST outputs, thereby obtaining residual components of the color components.
906
decode the encoded video bitstream based on the residual components of the color components
End 1000
CPU
941
GPU
942
FPGA
943
Accl.
944
System Bus
948
947
945
946
940
Graphics
Adapter
950
949
Network
Interface
954
955
923
922
920
921
910
909
907
908
1006
1005
1002
1003
1001

JOINT COMPONENT SECONDARY TRANSFORM

CROSS-REFERENCE TO RELATED APPLICATION

This application is a continuation of U.S. application Ser. No. 18/154,449 filed on Jan. 13, 2023, which is a continuation of U.S. application Ser. No. 17/072,606 filed on Oct. 16, 2020, which claims priority from U.S. Provisional Application No. 63/020,280 filed on May 5, 2020, each of which is incorporated herein by reference in its entirety.

FIELD

This disclosure relates generally to the field of data processing, and more particularly to video encoding and decoding. Even more particularly, embodiments of the disclosure are directed to a joint component secondary transform (JCST) scheme for coding residuals from multiple color components, e.g., residuals from two chroma components.

BACKGROUND

AOMedia Video 1 (AV1) is an open video coding format designed for video transmissions over the Internet. AV1 was developed by the Alliance for Open Media (AOMedia), a consortium founded in 2015 that includes semiconductor firms, video on demand providers, video content producers, software development companies and web browser vendors, as a successor to VP9. Many components of the AV1 project were sourced from previous research efforts by AOMedia members. Individual contributors started experimental technology platforms years before. For example, Xiph's/Mozilla's Daala published code in 2010; Google's experimental VP9 evolution project VP10 was announced on Sep. 12, 2014; and Cisco's Thor was published on Aug. 11, 2015.

Built on the codebase of VP9, AV1 incorporates additional techniques, several of which were developed in experimental formats. The first version of the AV1 reference codec (0.1.0) was published on Apr. 7, 2016. The AOMedia announced the release of the AV1 bitstream specification on Mar. 28, 2018, along with a reference software-based encoder and decoder. On Jun. 25, 2018, a validated version 1.0.0 of the AV1 specification was released. On Jan. 8, 2019 a validated version 1.0.0 of the AV1 specification was released with Errata 1. The AV1 bitstream specification includes a reference video codec.

SUMMARY

In AV1, prediction residual signals generated for chroma channels, e.g., Cb and Cr, are highly correlated to each other. Thus, the residual coding can be further improved by reducing the statistical redundancy between Cb and Cr prediction residuals.

Embodiments of the instant disclosure provide solutions to the above problem.

For example, a method of decoding an encoded video bitstream using at least one processor comprises: obtaining an encoded video bitstream, the encoded video bitstream including encoded color components; entropy parsing the encoded color components; dequantizing the color components and obtaining transform coefficients of the color components; applying a joint components secondary transform (JCST) on the transform coefficients of the color components, thereby generating JCST outputs; performing a backward transform on the JCST outputs, thereby obtaining residual components of the color components; and decoding the encoded video bitstream based on the residual components of the color components.

BRIEF DESCRIPTION OF THE DRAWINGS

FIG. 9 is a flowchart illustrating a method of decoding according to embodiments.

DETAILED DESCRIPTION

Figure 1:
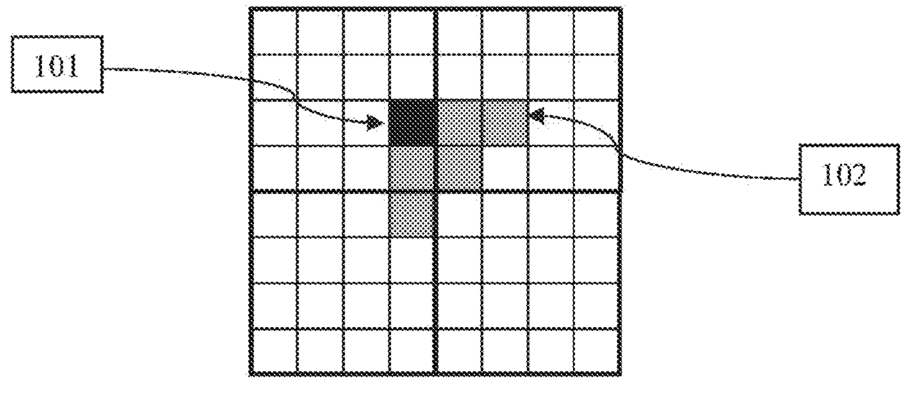
FIG. 1 is schematic illustration of coded coefficients covered by local templates.

Embodiments described herein provide methods and an apparatus for encoding and/or decoding image data.

Residual Coding in AV1

For each given transform unit, an AV1 coefficient coder starts with coding a skip sign, which is then followed by a transform kernel type and an end-of-block (EOB) position of all non-zero coefficients, when transform coding is not skipped. Then each coefficient value may be mapped to multiple level maps and a sign, where a sign plane covers signs of coefficients and the three level planes, each coefficient value may correspond to different ranges of coefficient magnitudes, namely lower-level, middle-level and higher-level planes. The lower level plane corresponds to the range of 0-2, the middle level plane corresponds to the range of 3-14, and the higher-level plane corresponds to the range of 15 and above.

After the EOB position is coded, the lower level and middle level planes are coded together in reverse scan order, the lower level plane indicating whether the coefficient magnitude is between 0 and 2, and the middle level plane indicating whether the range is between 3 and 14. Then the sign plane and higher level plane are coded together in a forward scan order, and the higher level plane indicates the residual value with a magnitude greater than 14. The remainder is entropy coded using Exp-Golomb code. AV1 adopts the traditional zig-zag scan order.

Such separation allows assignment of a rich context model to the lower level plane, which accounts for transform directions including bi-directional, horizontal, and vertical; transform size; and up to five neighboring coefficients for improved compression efficiency, at the modest context model size. The middle level plane uses a context model similar to the lower level plane with a number of context neighbor coefficients being reduced from 5 to 2. The higher-level plane is coded using Exp-Golomb code without using the context model. In the sign plane, signs, except that the DC sign, are coded using neighboring transform units' DC signs as context information. Other sign bits are coded directly without using the context model.

In Versatile Video Coding (VVC), the coding block is firstly split into 4×4 sub-blocks, and sub-blocks inside the coding block, as well as the transform coefficients within a sub-block are coded according to predefined scan orders. For a sub-block having at least one non-zero transform coefficient, the coding of transform coefficients is separated into four scan passes.

For example, suppose absLevel is the absolute value of a current transform coefficient. In the first pass, the syntax elements sig_coeff_flag (indicating absLevel is larger than 0), par_level_flag (indicating the parity of absLevel), and rem_abs_gt1_flag (indicating (absLevel−1)>>1 is greater than 0) are coded; in the second pass, the syntax element rem_abs_gt2_flag (indicating absLevel is greater than 4) is coded; in the third pass, the remaining values (referred as abs_remainder) of coefficient levels are invoked; and if necessary; in the fourth pass, the sign information is coded.

In order to exploit the correlation between transform coefficients, previously coded coefficients covered by local templates, shown in FIG. 1, are used in the context selection for current coefficients, where the position (101) shown in black indicates the position of a current transform coefficient and positions (102) shown shaded indicate its five neighbors. Here, absLevel1[x][y] represents the partially reconstructed absolute levels the coefficient at its position (x, y) after the first pass, d represents the diagonal position of the current coefficient (d=x+y), numSig represents the number of non-zero coefficients in local template, and sumAbs1 represents the sum of partially reconstructed absolute level absLevel1[x][y] for coefficients covered by local template.

When coding sig_coeff_flag of the current coefficient, the context model index is selected depending on sumAbs1 and the diagonal position d. More specifically, for the Luma component, the context model index is determined according to Eq. 1: ctxSig=18*max(0, state−1)+min(sumAbs1, 5)+(d<2?12:(d<5?6:0)). This is equivalent to the following Eq. 2 & Eq. 3. Eq 2: ctxIdBase=18*max(0, state−1)+(d<2?12:(d<5?6:0)). Eq. 3: ctxSig=ctxIdSigTable[min(sumAbs1, 5)]+ctxIdBase For Chroma, the context model index is determined according to Eq. 4: ctxSig=12*max(0, state−1)+min(sumAbs1, 5)+(d<2?6:0), which is equivalent to the following Eq. 5 & Eq. 6. Eq. 5: ctxIdBase=12*max(0, state−1)+(d<2?6:0). Eq. 6: ctxSig=ctxIdSigTable[min(sumAbs1, 5)]+ctxIdBase Here, the scalar quantizer is used if the dependent quantization is enabled and the state is derived using a state transition process; the table ctxIdSigTable stores the context model index offset, ctxIdSigTable[0~5]={0, 1, 2, 3, 4, 5}.

When coding the par_level_flag of the current coefficient, the context model index is selected depending on sumAbs1, numSig and diagonal position d. More specifically, for the Luma component, the context model index is determined according to Eq. 7: ctxPar=1+min(sumAbs1−numSig, 4)+(d==0?15:(d<3?10:(d<10?5:0))), which is equivalent to the following Eq. 8 & Eq. 9. Eq. 8: ctxIdBase=(d=0?15:(d<3?10:(d<10?5:0))). Eq. 9: ctxPar=1+ctxIdTable[min(sumAbs1−numSig, 4)]+ctxIdBase. For a chroma, the context model index is determined according to Eq. 10: ctxPar=1+min(sumAbs1−numSig, 4)+(d==0?5:0), which is equivalent to the following Eq. 11 & Eq. 12. Eq. 11: ctxIdBase=(d==0?5:0). Eq. 12: ctxPar=1+ctxIdTable[min(sumAbs1−numSig, 4)]+ctxIdBase.

Here, the table ctxIdTable stores the context model index offset, ctxIdTable[0~4]={0, 1, 2, 3, 4}. When coding rem_abs_gt1_flag and rem_abs_gt2_flag of the current coefficient, the context model index is determined in the same way as par_level_flag: ctxGt1=ctxPar and ctxGt2=ctxPar (Eq. 13).

Different sets of context models are used for rem_abs_gt1 flag and rem_abs_gt2_flag. Thus, the context model used for rem_abs_gt1 flag is different from that of rem_abs_gt2_flag, even though ctxGt1 is equal to ctxGt2.

Residual Coding for Transform Skip Mode (TSM) and Differential Pulse-Code Modulation (DPCM)

In order to adapt residual coding to the statistics and signal characteristics of the transform skip and BDPCM residual levels, which represent the quantized prediction residual (spatial domain), it is proposed to modify the following residual coding process on top of the residual coding scheme described in the residual coding in AV1 section, above, and apply for TSM and BDPCM modes.

Three coding passes are now described. In the first coding pass, sig_coeff_flag, coeff_sign_flag, abs_level_gt1_flag, par_level_flag are coded first in one pass. In the second coding pass, abs_level_gtX_flag are coded, where X can be 3, 5, 7, . . . . In the third pass, the remainder of the coefficient levels are coded. The coding pass is operated at the CG level, that is, for each CG, three coding passes are performed.

There is no significant scanning position. Since the residual signal reflects the spatial residual after the prediction and no energy compaction by transform is performed for TS, the high probability for trailing zeros or insignificant levels at the bottom right corner of the transform block is not given. Thus, last significant scanning position signaling is omitted in this case. Instead, the first subblock to be processed is the most bottom right subblock within the transform block.

Subblock CBFs are now described. The absence of the last significant scanning position signaling requires subblock CBF signaling with coded_sub_block_flag for TS to be modified as follows:

Due to quantization, the aforementioned sequence of insignificance may still occur locally inside a transform block. Thus, the last significant scanning position is removed as described before and coded_sub_block_flag is coded for all sub-blocks.

The coded_sub_block_flag for the subblock covering the DC frequency position (top-left subblock) presents a special case. In VVC Draft 3, the coded_sub_block_flag for this subblock is never signaled and is inferred to be equal to 1. When the last significant scanning position is located in another subblock, there is at least one significant level outside the DC subblock. Consequently, the DC subblock may contain only zero/non-significant levels although the coded_sub_block_flag for this subblock is inferred to be equal to 1. With the absence of the last scanning position information in TS, the coded_sub_block_flag for each subblock is signaled. This also includes the coded_sub_block_flag for the DC subblock, except when all other coded_sub_block_flag syntax elements are already equal to 0. In this case, the DC coded_sub_block_flag is inferred to be equal to 1 (inferDcSbCbf=1). Since there is at least one significant level in this DC subblock, the sig_coeff_flag syntax element for the first position at (0,0) is not signaled and is derived to be equal to 1 (inferSbDcSigCoeffFlag=1) instead if all other sig_coeff_flag syntax elements in this DC subblock are equal to 0.

The context modeling for coded_sub_block_flag may be changed. The context model index may be calculated as the sum of the coded_sub_block_flag to the right and the coded_sub_block_flag below the current subblock instead of and a logical disjunction of both.

The following is a description of sig_coeff_flag context modelling: The local template in sig_coeff_flag context modeling may be modified to only include the neighbor to the right ($NB_0$) and the neighbor below ($NB_1$) the current scanning position. The context model offset represents the number of significant neighboring positions sig_coeff_flag[$NB_0$]+sig_coeff_flag[$NB_1$]. Hence, the selection of different contexts is set depending on the diagonal d within the current transform block (d is removed). This results in three context models and a single context model set for coding the sig_coeff_flag flag.

The following is a description of abs_level_gt1_flag and par_level_flag context modelling: a single context model is employed for abs_level_gt1_flag and par_level_flag.

The following is a description of abs_remainder coding: Although the empirical distribution of the transform skip residual absolute levels may typically still fit a Laplacian or a Geometrical distribution, there may exist larger instationarities than for transform coefficient absolute levels. Particularly, the variance within a window of consecutive realization is higher for the residual absolute levels. This motivates the following modifications of the abs_remainder syntax binarization and context modelling:

Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g. introducing abs_level_gt5_flag, abs_level_gt7_flag, and so on until a cutoff is reached. The cutoff itself is fixed to 5 (numGtFlags=5).

The template for the rice parameter derivation may be modified, i.e., only the neighbor to the left and the neighbor below the current scanning position are considered, similar to the local template for sig_coeff_flag context modeling.

The following is a description of coeff_sign_flag context modelling: Due to the instationarities inside the sequence of signs and the fact that the prediction residual is often biased, the signs can be coded using context models, even when global empirical distribution is almost uniformly distributed. A single dedicated context model may be used for the coding of the signs and the sign may be parsed after sig_coeff_flag to keep all context coded bins together.

The following is a description of restriction of context coded bins: The total number of context coded bins per TU is restricted to be the TU area size, multiplied by 2, e.g., the maximum number of context coded bins for a 16×8 TU is 16×8×2=256. The budget of context coded bins is consumed at the TU-level, that is, instead of the individual budget of context coded bins per CG, all the CGs inside the current TU share one budget of context coded bins.

Joint Coding of Chroma Residuals

VVC Draft 6 supports a mode where chroma residuals are coded jointly. The usage (activation) of a joint chroma coding mode is indicated by a TU-level flag tu_joint_cbcr_residual_flag and the selected mode is implicitly indicated by chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the chroma QP offset values signalled for the regular chroma residual coding mode. These chroma QP offset values are used to derive the chroma QP values for those blocks coded using the joint chroma residual coding mode. When a corresponding joint chroma coding mode (mode 2 in Table 1 below) is active in a TU, the chroma QP offset is added to the applied luma-derived chroma QP during quantization and decoding of that TU. For the other modes (modes 1 and 3 in Table 1), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC[x][y] in Table 1) is signalled, and residual block for Cb (resCb) and residual block for Cr (resCr) are derived considering information such as tu_cbf_cb, tu_cbf_cr, and CSign (sign value specified in the slice header).

The three joint chroma coding modes described above are only supported in an intra coded CU. In the inter-coded CU, only mode 2 is supported. Hence, for the inter coded CU, the syntax element tu_joint_cbcr_residual_flag is only present if both chroma cbfs are equal to 1.

TABLE 1

Reconstruction of chroma residuals

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ]) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ]) >> 1<br>resCr[ x ][ y ] = resJointC[ x ][ y ] | 3 |

Here, the value CSign is a sign value (+1 or −1), which is specified in the slice header, and resJointC[ ][ ] is the transmitted residual.

Figure 2:
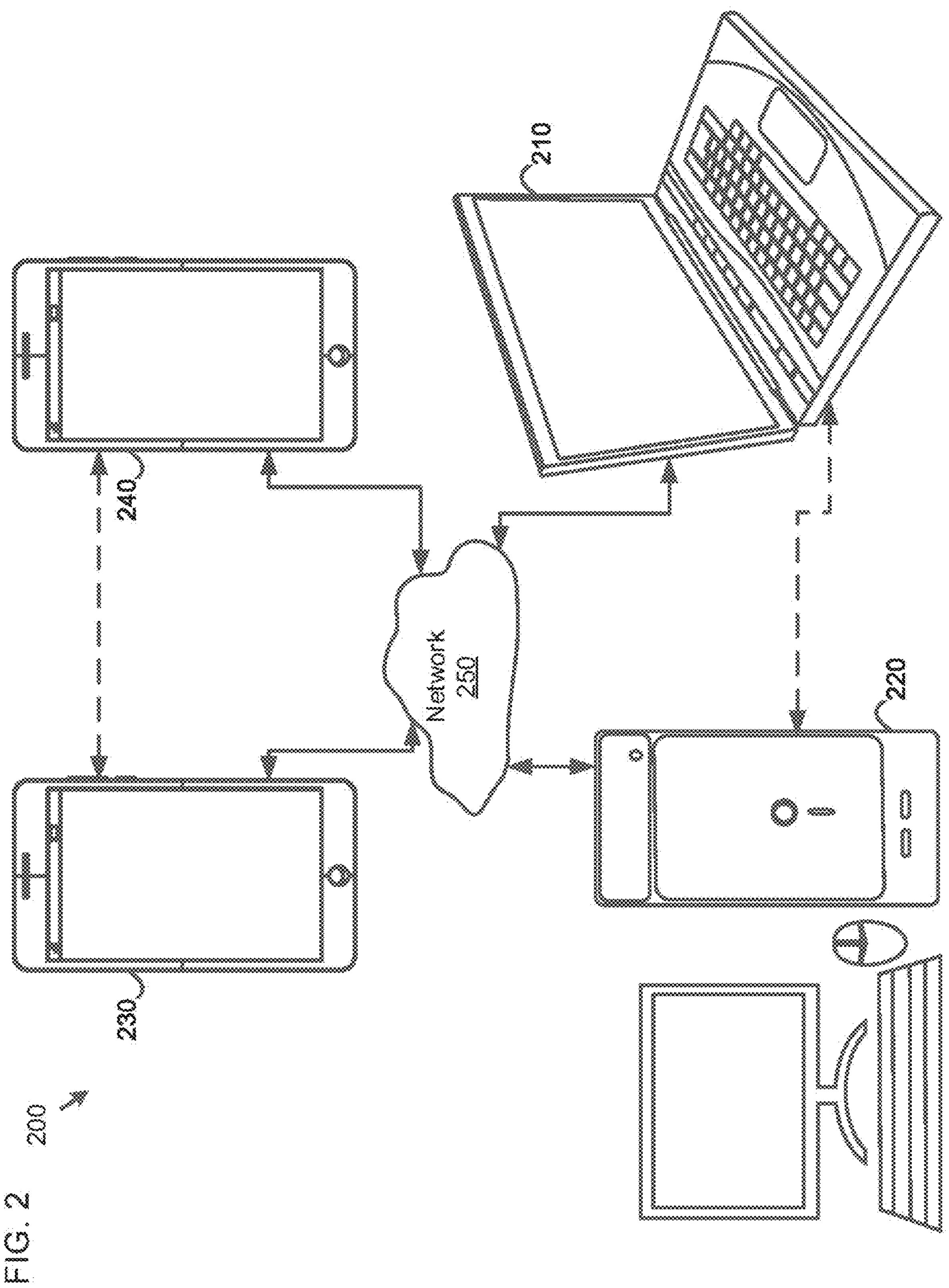
FIG. 2 is a block diagram of a communication system according to embodiments.

Referring now to FIG. 2, FIG. 2 is a block diagram of a communication system 200 according to embodiments. The communication system 200 may include at least two terminals 210 and 220 interconnected via a network 250. For unidirectional transmission of data, a first terminal 210 may code data at a local location for transmission to a second terminal 220 via the network 250. The second terminal 220 may receive the coded data of the first terminal 210 from the network 250, decode the coded data and display the decoded data. Unidirectional data transmission may be common in media serving applications and the like.

FIG. 2 further illustrates a second pair of terminals 230 and 240 provided to support bidirectional transmission of coded data that may occur, for example, during videoconferencing. For bidirectional transmission of data, each terminal 230 or 240 may code data captured at a local location for transmission to the other terminal via the network 250. Each terminal 230 or 240 also may receive the coded data transmitted by the other terminal, may decode the coded data and may display the decoded data at a local display device.

In FIG. 2, the terminals 210-240 may be illustrated as servers, personal computers and smartphones, but principles of the embodiments are not so limited. The embodiments find application with laptop computers, tablet computers, media players and/or dedicated video conferencing equipment. The network 250 represents any number of networks that convey coded data among the terminals 210-240, including for example wireline and/or wireless communication networks. The communication network 250 may exchange data in circuit-switched and/or packet-switched channels. Representative networks include telecommunications networks, local area networks, wide area networks and/or the Internet. For the purposes of the present discussion, an architecture and topology of the network 250 may be immaterial to an operation of the embodiments unless explained herein below.

Figure 3:
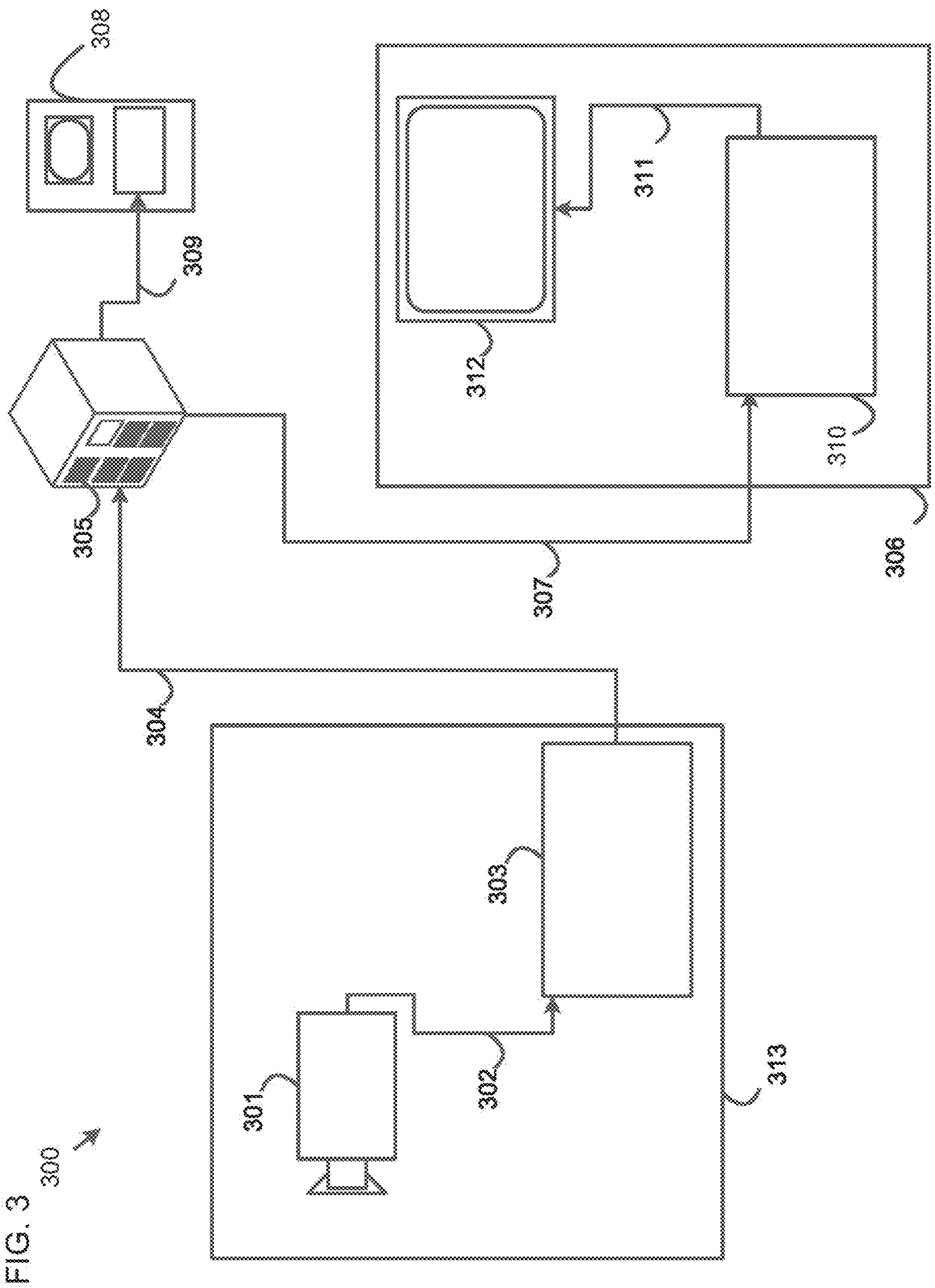
FIG. 3 is a diagram of a placement of a G-PCC compressor and a G-PCC decompressor in an environment, according to embodiments.

FIG. 3 is a diagram of a placement of a G-PCC compressor 303 and a G-PCC decompressor 310 in an environment, according to embodiments. The disclosed subject matter can be equally applicable to other enabled applications, including, for example, video conferencing, digital TV, storing of compressed data on digital media including CD, DVD, memory stick and the like, and so on.

A streaming system 300 may include a capture subsystem 313 that can include a source 301, for example a digital camera, creating, for example, uncompressed data 302. The data 302 having a higher data volume can be processed by the G-PCC compressor 303 coupled to the source 301. The G-PCC compressor 303 can include hardware, software, or a combination thereof to enable or implement aspects of the disclosed subject matter as described in more detail below. Encoded data 304 having a lower data volume can be stored on a streaming server 305 for future use. One or more streaming clients 306 and 308 can access the streaming server 305 to retrieve copies 307 and 309 of the encoded data 304. A client 306 can include the G-PCC decompressor 310, which decodes an incoming copy 307 of the encoded data and creates outgoing data 311 that can be rendered on a display 312 or other rendering devices (not depicted). In some streaming systems, the encoded data 304, 307 and 309 can be encoded according to video coding/compression standards. Examples of those standards include those being developed by MPEG for G-PCC.

Figure 4:
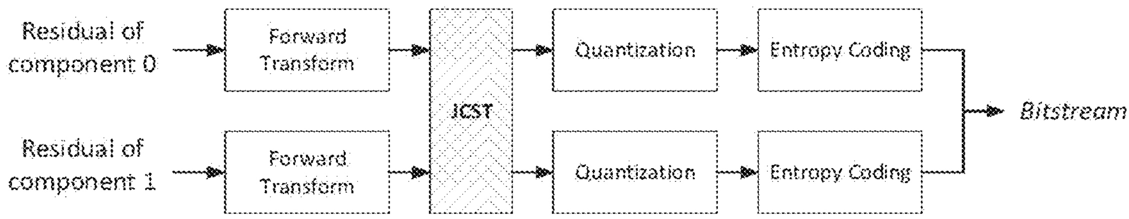
FIG. 4 is a schematic illustration of an encoder/decoder scheme according to embodiments.

Embodiments of the instant disclosure may apply a secondary transform jointly on the transform coefficients of multiple color components. This proposed joint transform scheme may be referred to as Joint Components Secondary Transform (JCST). The proposed encoder scheme using JCST for two color components is shown in FIG. 4, where JCST is performed after forward transform and before quantization.

Figure 5:
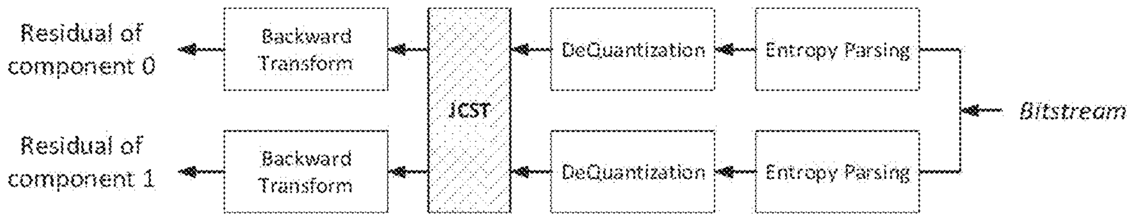
FIG. 5 is a schematic illustration of an encoder/decoder scheme according to embodiments.

Embodiments of the instant disclosure may perform JCST after a dequantization transform and before a backward (inverse) transform, as illustrated in FIG. 5.

Referring to FIG. 9, in a first block 901, the method 900 includes obtaining an encoded video bitstream, the encoded video bitstream including encoded color components.

In a second block 902, the method 900 includes entropy parsing the encoded color components.

In a third block 903, the method 900 includes dequantizing the color components and obtaining transform coefficients of the color components.

In a fourth block 904, the method 900 includes applying a joint components secondary transform (JCST) on the transform coefficients of the color components, thereby generating JCST outputs.

According to embodiments, a fifth block 905 may be provided. In the fifth block 905, the method 900 may include performing a backward transform on the JCST outputs, thereby obtaining residual components of the color components.

According to embodiments, a sixth block 906 may be provided. In the sixth block 906, the method 900 may include decoding the encoded video bitstream based on the residual components of the color components.

According to embodiments, the method may be performed in reverse as an encoding method. Indeed, while descriptions herein may refer to particular encoding or decoding schemes, these descriptions are not limited to the particular encoding or decoding scheme. That is, they are equally applicable to both encoding and decoding schemes.

In one embodiment, the input to JCST may be Cb and Cr transform coefficients.

In another embodiment, the input to JCST may be Y, Cb, and Cr transform coefficients.

Figure 6:
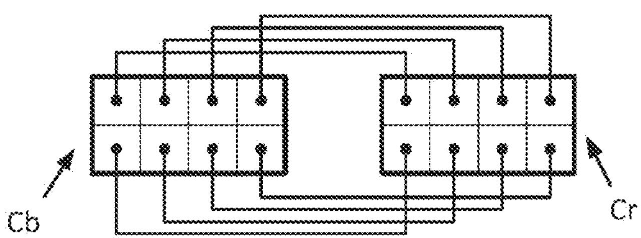
FIG. 6 is a schematic illustration of pairs of Cb and Cr transform coefficients coming from two 4×2 blocks, according to embodiments.

In one embodiment, JCST may be performed element-wise, such that JCST is performed for each pair of Cb and Cr transform coefficients that are located at the same coordinate. Examples of pairs of Cb and Cr transform coefficients coming from two 4×2 blocks are illustrated in FIG. 6.

In one embodiment, JCST may be a two-point transform, and the input may be a pair of Cb and Cr transform coefficients located at the same coordinate.

In one embodiment, JCST may be a two-point transform, and the output may be a pair of secondary transform coefficients that are replacing a pair of Cb and Cr transform coefficients.

Figure 7:
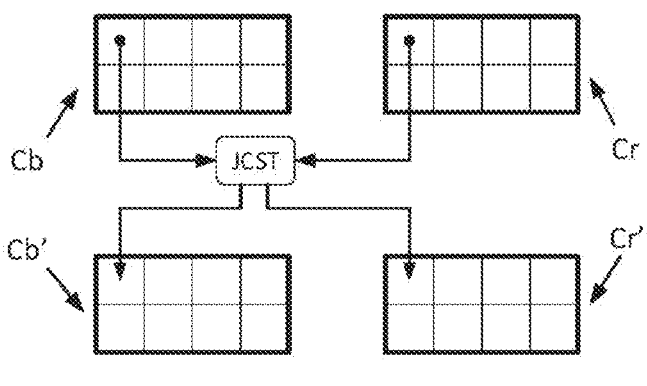
FIG. 7 is a schematic illustration of a JCST applied on two 4×2 Cb and Cr blocks, according to embodiments.

In one embodiment, the output pair of Cb and Cr transform coefficients may be located at the same locations as the Cb and Cr transform coefficient pair used as the input of the JCST. Examples of the JCST applied on two 4×2 Cb and Cr blocks are illustrated in FIG. 7, and the output of the JCST constructing another two 4×2 Cb and Cr blocks will be further quantized/dequantized and entropy coded/parsed at encoder/decoder.

In one embodiment, the output of the JCST may be less than the input. For example, the input may be one pair of Cb and Cr coefficients, and the output may be only one secondary transform coefficient.

In one embodiment, the transform applied in the JCST may include, but may not necessarily be limited to a Hadamard transform, a Discrete Cosine/Sine Transform, and a data-driven transform such as KLT or LGT (Line Graph Transform).

In one embodiment, the input of the JCST may come from more than one pair (e.g. triple) of different color components located at different coordinates.

Figure 8:
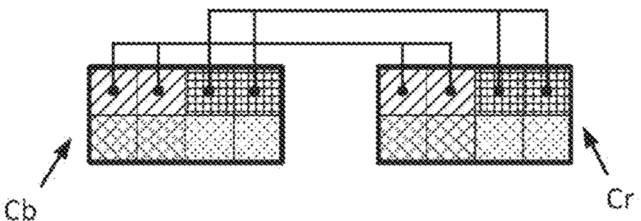
FIG. 8 is a schematic illustration of a JCST using a four-point transform according to embodiments.

In one embodiment, the JCST may be a four-point transform, and the input may be two pairs of Cb and Cr transform coefficients located at the same coordinate. An Example is shown in FIG. 8.

In one embodiment, the output may be more than one pair of secondary transform coefficients that are replacing more than one pair of Cb and Cr transform coefficients.

In one embodiment, the output of the JCST may be less than input. For example, the input may be two pairs of Cb and Cr coefficients, and the output may only be two secondary transform coefficients.

In one embodiment, the transform applied in the JCST may include, but may not necessarily be limited to a Hadamard transform, a Discrete Cosine/Sine Transform, or data-driven transforms such KLT, LGT (Line Graph Transform).

In one embodiment, the JCST may be applied for a limited range of block sizes.

In one example, the JCST may be applied for a block size smaller than or equal to a given threshold, wherein the block size may refer to a block width, a block height, a block area size, a block width and height, and maximum (or minimum) of block width and height.

In one example, the JCST may be applied for a block size greater than or equal to a given threshold, wherein the block size may refer to a block width, a block height, a block area size, a block width and height, and a maximum (or minimum) of block width and height.

In one embodiment, whether the JCST is applied may be signaled by a JCST flag at a transform block-level.

In one embodiment, the JCST flag may be signaled after the transform coefficients.

In one embodiment, the JCST flag may be signaled only when at least one color component, that is applying the JCST, has at least one non-zero coefficients.

In one embodiment, the JCST flag is signaled only when each of the color components, that are applying the JCST, has at least one non-zero coefficients.

In one embodiment, the JCST flag is signaled only if the total number of nonzero coefficients of the color components, that are applying the JCST, is greater than or equal to a given threshold value, e.g., 0, 1, 2, 3, or 4.

In one embodiment, the JCST flag is signaled only if the last nonzero coefficient of the color components, that are applying the JCST, is located at a position along the scanning order that is greater than a given threshold, e.g., 0, 1, 2, 3, or 4.

In one embodiment, whether the JCST is applied is signaled by a JCST flag at a CU-level (or CB-level).

In one embodiment, whether the JCST can be used is signaled using high-level syntax, including, but not limited to VPS, SPS, PPS, Slice header, Picture header, Tile, Tile group, or CTU-level.

In one embodiment, when the JCST is applied, the primary transform is a given transform type.

In one example, the given transform type is DCT-2. In another example, the given transform type is DST-7.

In one embodiment, the selection of the transform applied in the JCST depends on coded information, including but not limited to: the primary transform type, the intra prediction mode, e.g., intra prediction directions/angles, the inter prediction mode, whether IntraBC is applied, whether Palette mode is applied, whether DPCM mode is applied, the motion vector information (direction, magnitude), whether Sub-block motion is applied, and whether warped motion (affine motion) is applied.

In one embodiment, the context used for entropy coding of the flags that indicate whether the JCST is applied depends on neighboring block information, which includes but is not limited to information listed in above, that comes from neighboring blocks.

The techniques, described above, can be implemented in a video encoder and/or decoder adapted for compression/decompression. The encoder and/or decoder can be implemented in hardware, software, or any combination thereof, and the software, if any, can be stored in one or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

The techniques, described above, can be implemented as computer software using computer-readable instructions and physically stored in one or more computer-readable media. For example, FIG. 10 shows a computer system 1000 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
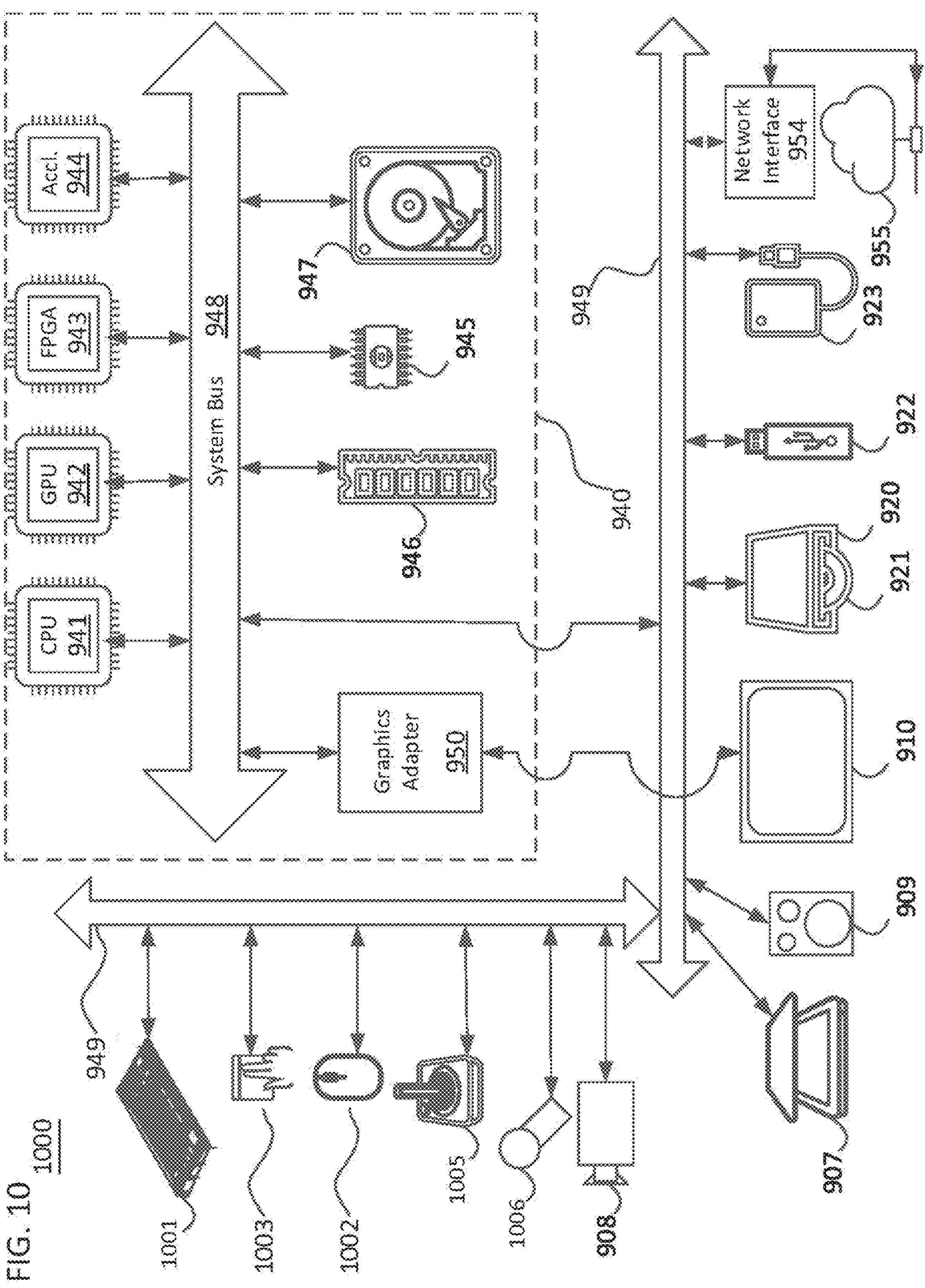
FIG. 10 is a diagram of a computer system suitable for implementing embodiments.

The components shown in FIG. 10 for computer system 1000 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 910, data-glove, joystick 1005, microphone 1006, scanner 907, camera 908.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 1005, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 1000.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms:

ALF: Adaptive Loop Filter,
APS: Adaptation Parameter Set,
AV1: AOMedia Video 1,
AV2: AOMedia Video 2,
CB: Coding Block,
CC-ALF: Cross-Component Adaptive Loop Filter,
CDEF: Constrained Directional Enhancement Filter,
CU: Coding Unit,
CTU: Coding Tree Unit,
DPCM: Differential Pulse-Code Modulation,
DPS: Decoding Parameter Set,
HDR: high dynamic range,
HEVC: High Efficiency Video Coding,
ISP: Intra Sub-Partitions,
JCCT: Joint Chroma Component Transform,
JVET: Joint Video Exploration Team,
LR: Loop Restoration Filter,
PDPC: Position Dependent Prediction Combination,
PPS: Picture Parameter Set,
PU: Prediction Unit,
SDR: standard dynamic range,
SPS: Sequence Parameter Setting,
TSM: Transform Skip Mode,
TU: Transform Unit,
VVC: Versatile Video Coding,
WAIP: Wide-Angle Intra Prediction, and
VPS: Video Parameter Set

What is claimed is:

1. A method of video decoding performed by a computer system, the method comprising:

obtaining a video bitstream comprising a Cb color component and a Cr color component;

obtaining, via the video bitstream, a first set of transform coefficients corresponding to the Cb color component and a second set of transform coefficients corresponding to the Cr color component;

generating joint components secondary transform (JCST) outputs by applying, on an element-by-element basis, a JCST to the first and second sets of transform coefficients, wherein the JCST is a two-point transform performed on co-located pairs of Cb and Cr transform coefficients, and wherein, for each co-located pair of Cb and Cr transform coefficients, the Cb transform coefficient is located at the same coordinates in a Cb transform block as the Cr transform coefficient is in a Cr transform block;

obtaining residual blocks for each of the Cb color component and the Cr color component by applying an inverse transform on the JCST outputs; and decoding a portion of the video bitstream using the obtained residual blocks.

2. The method of claim 1, further comprising parsing, from the video bitstream, a JCST flag that indicates whether the JCST is to be applied to the first and second sets of transform coefficients.

3. The method of claim 2, wherein the JCST flag is conditionally signaled when the first set of transform coefficients includes at least N non-zero coefficients.

4. The method of claim 3, wherein N is a positive, non-zero integer.

5. The method of claim 1, wherein a number of JCST outputs is less than a number of transform coefficients in the first and second set of transform coefficients.

6. The method of claim 1, wherein the first set of transform coefficients corresponds to the Cb transform block and the second set of transform coefficients corresponds to the Cr transform block.

7. The method of claim 6, wherein the Cb transform block and the Cr transform block are 4×2 blocks.

8. The method of claim 6, wherein the JCST is conditionally applied based on whether the Cb and Cr transform block sizes meet one or more size criteria.

9. The method of claim 6, wherein the JCST is conditionally applied based on a number of nonzero values in the Cb transform block and/or the Cr transform block.

10. The method of claim 1, wherein the JCST comprises at least one of: a Hadamard transform, a discrete cosine transform, a discrete sine transform, and a data-driven transform.

11. The method of claim 10, further comprising selecting a transform of the JCST based on coded information.

12. The method of claim 1, wherein obtaining the first set of transform coefficients comprises entropy parsing Cb color component information from the video bitstream.

13. The method of claim 1, wherein obtaining the first set of transform coefficients comprises dequantizing Cb color component information from the video bitstream.

14. The method of claim 1, wherein the video bitstream includes include Y, Cb, and Cr color components.

15. The method of claim 1, wherein the inverse transform corresponds to a discrete cosine transform or a discrete sine transform.

16. A computing system, comprising:

control circuitry;

memory; and one or more sets of instructions stored in the memory and configured for execution by the control circuitry, the one or more sets of instructions comprising instructions for:

obtaining a video bitstream comprising a Cb color component and a Cr color component;

obtaining, via the video bitstream, a first set of transform coefficients corresponding to the Cb color component and a second set of transform coefficients corresponding to the Cr color component;

generating joint components secondary transform (JCST) outputs by applying, on an element-by-element basis, a JCST to the first and second sets of transform coefficients, wherein the JCST is a two-point transform performed on co-located pairs of Cb and Cr transform coefficients, and wherein, for each co-located pair of Cb and Cr transform coefficients, the Cb transform coefficient is located at the same coordinates in a Cb transform block as the Cr transform coefficient is in a Cr transform block;

obtaining residual blocks for each of the Cb color component and the Cr color component by applying an inverse transform on the JCST outputs; and decoding a portion of the video bitstream using the obtained residual blocks.

17. A non-transitory computer-readable recording medium storing a video bitstream that is generated by a video encoding method, the method comprising:

obtaining video data comprising a plurality of video frames, including a current video frame that includes a Cb color component and a Cr color component;

obtaining residual blocks for each of the Cb color component and the Cr color component;

obtaining Cb and Cr transform blocks by performing respective primary transforms on each of the residual blocks;

generating joint components secondary transform (JCST) outputs by applying, on an element-by-element basis, a JCST to the Cb and Cr transform blocks, wherein the JCST is a two-point transform performed on co-located pairs of Cb and Cr transform values in the Cb and Cr transform blocks, and wherein, for each co-located pair of Cb and Cr transform values, the Cb transform value is located at the same coordinates in the Cb transform block as the Cr transform value is in the Cr transform block;

obtaining transform coefficients by performing a quantization on the JCST outputs; and encoding the transform coefficients into the video bitstream.

18. The non-transitory computer-readable recording medium of claim 17, wherein the video bitstream comprises a JCST flag that indicates whether the JCST is to be applied to the Cb and Cr transform blocks.

19. The non-transitory computer-readable recording medium of claim 17, wherein the video bitstream comprises Y, Cb, and Cr color components.

20. The non-transitory computer-readable recording medium of claim 17, wherein the JCST comprises at least one of: a Hadamard transform, a discrete cosine transform, a discrete sine transform, and a data-driven transform.

* * * * *